(12) United States Patent
Kurani et al.

(10) Patent No.: US 11,763,303 B1
(45) Date of Patent: Sep. 19, 2023

(54) IDENTITY MANAGEMENT SERVICE VIA A USER-LEVEL TOKEN

(71) Applicant: Wells Fargo Bank, N.A., San Francisco, CA (US)

(72) Inventors: Ashish B. Kurani, Hillsborough, CA (US); Kristine Ing Kushner, Orinda, CA (US); Brian M. Pearce, Pleasanton, CA (US); Steven E. Puffer, Champlin, MN (US); Nikolai Stroke, Gilbert, AZ (US); Paul Vittimberga, Oakland, CA (US); Young M. Yang, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 496 days.

(21) Appl. No.: 15/456,122

(22) Filed: Mar. 10, 2017

(51) Int. Cl.
*G06Q 20/40* (2012.01)

(52) U.S. Cl.
CPC .............................. *G06Q 20/4014* (2013.01)

(58) Field of Classification Search
CPC ................................................ G06Q 20/4014
See application file for complete search history.

(56) References Cited

U.S. PATENT DOCUMENTS

| | | |
|---|---|---|
| 6,775,782 B1 | 8/2004 | Buros et al. |
| 9,060,057 B1 | 6/2015 | Danis |
| 9,084,114 B2 | 7/2015 | Beilis et al. |
| 9,124,572 B1 | 9/2015 | Hromi et al. |
| 9,232,394 B2 | 1/2016 | Bombacino et al. |
| 9,288,062 B2 | 3/2016 | Feltham et al. |
| 9,846,878 B2* | 12/2017 | Kumnick et al. .. G06Q 20/4016 |

(Continued)

FOREIGN PATENT DOCUMENTS

| | | |
|---|---|---|
| EP | 2096829 B1 | 12/2010 |
| WO | 02/43346 A1 | 5/2002 |

(Continued)

OTHER PUBLICATIONS

Chow et al., "Authenticating Displayed Names in Telephony", Bell Labs Technical Journal, 14(1), 267-282, 2009.

(Continued)

*Primary Examiner* — David P Sharvin
*Assistant Examiner* — Steven R Chism
(74) *Attorney, Agent, or Firm* — Foley & Lardner LLP (57) ABSTRACT

A method includes verifying the identity of an individual. The method further includes receiving non-financial data from the individual and generating a user-level profile. The user-level profiles include the non-financial data received from the individual. The method further includes generating a user-level token unique to the individual. The user-level token is associated with the generated user-level profile. The method also includes provisioning the user-level token to a device associated with the individual. The method further includes receiving an identity verification request comprising the user-level token, wherein the identity verification request is structured as a financial transaction card-originated message, validating the user-level token, and analyzing a context of the received user-level token to determine a relevant non-financial data element included in the non-financial information within the user-level profile. The method also includes transmitting an identity verification approval including the relevant non-financial data element.

7 Claims, 7 Drawing Sheets

(56) References Cited

U.S. PATENT DOCUMENTS

| | | | |
|---|---|---|---|
| 10,135,802 B2* | 11/2018 | Miu | G06Q 20/4014 |
| 2006/0191995 A1* | 8/2006 | Stewart et al. | G06Q 20/02 |
| | | | 235/382 |
| 2009/0182674 A1* | 7/2009 | Patel et al. | G06Q 20/10 |
| | | | 705/72 |
| 2011/0145152 A1* | 6/2011 | McCown | G06Q 20/3674 |
| | | | 705/67 |
| 2013/0159154 A1* | 6/2013 | Purves et al. | G06Q 20/363 |
| | | | 705/35 |
| 2013/0205380 A1 | 8/2013 | Avni et al. | |
| 2013/0304648 A1* | 11/2013 | O'Connell et al. | G07C 9/10 |
| | | | 705/44 |
| 2014/0006190 A1 | 1/2014 | Loomis, III et al. | |
| 2014/0229388 A1* | 8/2014 | Pereira et al. | G06Q 20/12 |
| | | | 705/76 |
| 2015/0025874 A1 | 1/2015 | Matute | |
| 2015/0058931 A1 | 2/2015 | Miu et al. | |
| 2015/0058950 A1* | 2/2015 | Miu | G06F 21/44 |
| | | | 726/7 |
| 2015/0112870 A1* | 4/2015 | Nagasundaram et al. | G06Q 20/385 |
| | | | 705/67 |
| 2015/0161603 A1* | 6/2015 | Fish | G06Q 30/0261 |
| | | | 705/44 |
| 2015/0236857 A1 | 8/2015 | Feltham et al. | |
| 2015/0312248 A1 | 10/2015 | Pruthi et al. | |
| 2015/0347965 A1 | 12/2015 | Wardman et al. | |
| 2016/0078430 A1 | 3/2016 | Douglas et al. | |
| 2016/0330027 A1 | 11/2016 | Ebrahimi | |
| 2017/0147975 A1 | 5/2017 | Natarajan et al. | |
| 2017/0262842 A1 | 9/2017 | Subbarayan et al. | |
| 2017/0346851 A1 | 11/2017 | Drake | |
| 2018/0039966 A1 | 2/2018 | Gill et al. | |
| 2018/0232725 A1* | 8/2018 | Dooley et al. | G06Q 20/385 |

FOREIGN PATENT DOCUMENTS

| | | |
|---|---|---|
| WO | 2007/009343 A1 | 1/2007 |
| WO | 2014/087179 A1 | 6/2014 |
| WO | 2015/198136 A1 | 12/2015 |

OTHER PUBLICATIONS

E. I. Tatly, D. Stegemann and S. Lucks, "Security Challenges of Location-Aware Mobile Business," Second IEEE International Workshop on Mobile Commerce and Services, Munich, Germany, 2005, pp. 84-95, doi: 10.1109/WMCS.2005.23. (Year: 2005).*

Gommans et al., "Token-based authorization of Connection Oriented Network resources", Gridnets conference proceedings, 2004. 8 pages.

You et al., "A Study on the Two-channel Authentication Method which Provides Two-way Authentication using Mobile Certificate in the Internet Banking Environment", Institute of Electrical and Electronics Engineers, Inc., Vol. 36, No. 8, 2008. 8 pages.

* cited by examiner

IDENTITY MANAGEMENT SERVICE VIA A USER-LEVEL TOKEN

BACKGROUND

Identity verification is necessary to ensure that an individual is who he or she purports to be. In financial industries, identity verification is often required by "know your customer" (KYC) or "customer identification program" (CIP) regulations. KYC and CIP programs are implemented to prevent identity theft, financial fraud, money laundering and terrorist financing. Furthermore, identity verification is used to perform many different functions in normal daily activities, such as making credit or debit card purchases, using an ATM, online shopping, purchasing a plane ticket, etc. However, in many instances additional information may be required by a user, such as membership numbers, frequent flier miles, age, personal identifying information, or other non-payment information. Additionally, for activities such as applying for loans, a user may be required to provide additional information, which may further require identity verification. Therefore, it would desirable to include non-identification information within identity management systems and methods.

SUMMARY

According to one example embodiment, a computer implemented method performed by an identity verification computing system includes verifying the identity of an individual. Non-financial data is received from the individual, and a user-level profile is generated. The user-level profile includes the non-financial data received from the individual. A user-level token unique to the individual is further generated. The user-level token is associated with the generated user-level profile. The user-level token is provisioned to a device associated with the individual. An entity computing system receives an identity verification request including the user-level token, wherein the identity verification request is structured as a financial transaction card-originated message. The user-level token is validated and a context of the received user-level token is analyzed to determine a relevant non-financial data element included in the non-financial information within the user-level profile. Additionally, an identity verification approval is transmitted to the entity computing system, including the relevant non-financial data element.

According to another example embodiment, a system includes personal identifying information associated with an individual of the system. The system also includes an identity verification computing system. The identity verification computing system includes a processor and instructions stored in non-transitory machine-readable media. The instructions are configured to cause the identity verification computing system to verify the identity of the individual using the personal identifying information associated with the individual, and to receive non-financial data from the individual. A user-level profile is generated. The user-level profile includes the non-financial data received from the individual and is stored in a memory of the identity verification computing system. A user-level token unique to the individual is generated. The user-level token is associated with the generated user-level profile. The user-level token is transmitted to a device associated with the individual. An entity computing system receives an identity verification request including the user-level token, wherein the identity verification request is structured as a financial transaction card-originated message. The user-level token is validated, and contextual data is analyzed to determine the non-financial data relevant to the contextual data included in the non-financial information within the user-level profile. An identity verification approval is transmitted to the entity computing system which includes the relevant non-financial information.

According to another example embodiment, a system includes a network interface configured to communicate with an entity computing system via a network. An identity database stores verified personal identifying information relating to an individual. The system also includes a memory and at least one processor configured to verify the identity of the individual using the personal identifying information associated with the individual. Non-financial data is received from the individual. A user-level profile is generated. The user-level profile includes the non-financial data received from the individual. A user-level token unique to the individual is generated. The user-level token is associated with the generated user-level profile. The user-level token is transmitted to a device associated with the individual via the network. An entity computing system receives an identity verification request comprising the user-level token. The user-level token is validated and it is determined if the request includes contextual data. The contextual data is analyzed to determine the non-financial data relevant to the contextual data within the user-level profile, and an identity verification approval is transmitted to the entity computing system along with the relevant non-financial data.

BRIEF DESCRIPTION OF THE FIGURES

The details of one or more implementations are set forth in the accompanying drawings and the description below. Other features, aspects, and advantages of the disclosure will become apparent from the description, the drawings, and the claims.

DETAILED DESCRIPTION

Before turning to the figures which illustrate example embodiments, it should be understood that the application is not limited to the details or methodology set forth in the following description or illustrated in the figures. It should also be understood that the phraseology and terminology employed herein is for the purpose of description only and should not be regarded as limiting.

Certain companies, organizations, or other entities may be better situated than others to verify the identities of individuals. For example, financial institutions (FIs) are required to comply with know your customer (KYC) and Customer Identification Program (CIP requirements. As such, FIs request and obtain access to substantial identifying information from new customers when accounts are opened, and may be particularly well-suited and trusted to perform accurate identity verification and related services. In many cases, such identity verification is performed in person, e.g., a banker compares a driver's license photo to the person standing in front of them as part of the account opening process. Accordingly, other entities (e.g., merchants) may rely on the fact that a trusted party (e.g., an FI) has verified an individual's identity rather than solely engaging in their own identity verification efforts. In some cases, an entity (e.g., a merchant) may choose to accept identity verification only from certain identity verification computing systems. For example, a merchant may trust identity verification performed by a U.S. bank, but may not trust purported identity verification performed by other entities that are not subject to KYC and CIP requirements. Similarly, the trusted party may be the most reliable source for storing additional information associated with the identity of an individual.

Referring generally to the figures, systems and methods for providing identity verification and identity based information via a user-level token are shown. According to various embodiments, an identity verification system may include multiple identity verification computing systems (e.g., associated with different FIs or other identity verification entities). An identity verification computing system may verify the identity of an individual and create a user-level token ("ULT") for the individual. For example, the ULT may be linked to a ULT profile maintained by an FI, or other institution. The ULT profile may include personal or other information related to a user, including financial information and non-financial information. The ULT profile may also include non-financial information such as identity information of the user (age, address, name, height, weight, biometrics, etc.), non-financial account information (frequent flyer program information, rewards/loyalty program information, social media accounts, on-line service accounts such as online dating accounts, etc.), multiple IDs (personal, business, etc.), and so on. While this information may be generally provided by a user in many instances, the verification of the information by the FI will be more trusted due to the additional verification requirements provided by the FI. The ULT profile may also include financial information such as payment cards, account numbers, DDA accounts, credit information, etc.

The ULT may then be pushed to a user device such as a smartphone. In some embodiments, the ULT may be stored in a virtual passport on the user device, which includes an individualized (e.g., customer-specific) digital signature that is easy to verify by the identity verification computing system, but is also very difficult to reproduce by fraudsters. In some embodiments, the virtual passport is implemented in a mobile wallet. The virtual passport may be used, for example, to verify an individual's identity to entities (e.g., merchants, currency exchanges, etc.), to objects (e.g., ATMs), to other individuals, etc. The virtual passport may include identification of the particular identity verification computing system that generated the virtual passport. An example virtual passport identity management system is described in U.S. Pat. Application No. 14/937,210, entitled "Identity Management Service via Virtual Passport," by Kurani et al., which is herein incorporated by reference in its entirety and for all purposes.

In some embodiments, the merchant transmits the ULT to the trusted third party via existing communication channels, such as a payment card network. For example, in some embodiments, the ULT may implemented in the form of a payment token used to make a credit card payment according to the EMV specification. The payment token may thus be used to effect payment as well as to provide other identity-related services. In other embodiments, the ULT is different than the payment token. For example, the ULT may be transmitted as part of an ISO 8583-compliant card-based transaction message, but may be different than the payment token. As described in further detail below, utilizing existing payment channels to provide identity verification improves an ability of a vendor to authenticate a customer automatically via a trusted third-party, such as an FI. Further, by providing both financial and non-financial information and services via an existing payment channel, data security of the payment channel is utilized for both types of information instead of relying on out-of-band communications via a potentially unsecured channel. Various embodiments enable value-add functionality to be provided by a FI to various vendors, thereby allowing for increased throughputs of transactions requiring authentication (e.g., by requiring fewer steps by the vendor) and/or additional non-financial information to be obtained at the time of the transactions. By providing both financial and non-financial data via an existing payment channel, transactions may also be simplified, allowing for a more seamless customer experience. Additionally, the embodiments described herein solve the technical and internet-centric problem of providing relevant financial and non-financial information related to an individual transaction. This is addressed by leveraging contextual information related to an individual transaction to automatically provide non-financial data, which is relevant to the transaction being performed, to a vendor initiating the transaction. A token may be provided by the customer to the vendor when initiating the transaction. The use of the token, in combination with contextual information associated with the vendor requesting verification of the token, allows for a customized data message to be relayed to the vendor, including both financial and non-financial information. This provides a technical solution to the internet-centric challenge of automatically providing customized financial and non-financial information associated with a particular transaction.

The ULT may be used in various different scenarios to enhance/streamline identity verification processes and provide other related services. For example, in one example scenario, a user may be at a merchant. The user may tap their phone at the point of sale (POS) device. As a result, the phone may communicate the user level token to the POS device. The merchant may communicate the ULT to the identity verification computing system via a card payment network. The identity verification computing system may access a user level profile associated with the ULT and return additional information to the merchant from the user level profile. The identity verification computing system may use various mechanisms to determine what information if any from the profile should be returned to the merchant. In some embodiments, merchants that utilize the identity verification service may create a profile with the service that specifies what information the merchant wishes to have returned. In some embodiments, the information that the merchant wishes to have returned may be specified in the identity verification request. In some embodiments, the user may be provided with a dashboard that enables the user to specify controls over information that may be shared with merchants. For example, the user may specify that some merchants be permitted access to certain information, while other merchants are not to be permitted access to the same information.

In some embodiments, the ULT may be provisioned directly to the merchant. For example, the merchant may be an online dating website. As part of registering for the online dating service, the user may be asked to use the user's phone to provide live video of the user (i.e., a video selfie) to the online dating service. The video selfie may then be provided to the identity verification service, which may compare the video against a photo of the user (e.g., the user's driver's license picture) to confirm the identity of the user. For example, the identity verification service may confirm that information provided by the user to the online dating service (name, age, address/city of residence, gender, etc.) matches information in the user level profile for the user. Upon verifying the identity of the user, the identity verification service may provide a merchant-specific ULT to the merchant. The merchant may then periodically confirm with the identity verification service that the ULT is still valid. For example, if the user passes away, the ULT for the online dating service may be rendered invalid on that basis.

Figure 1:
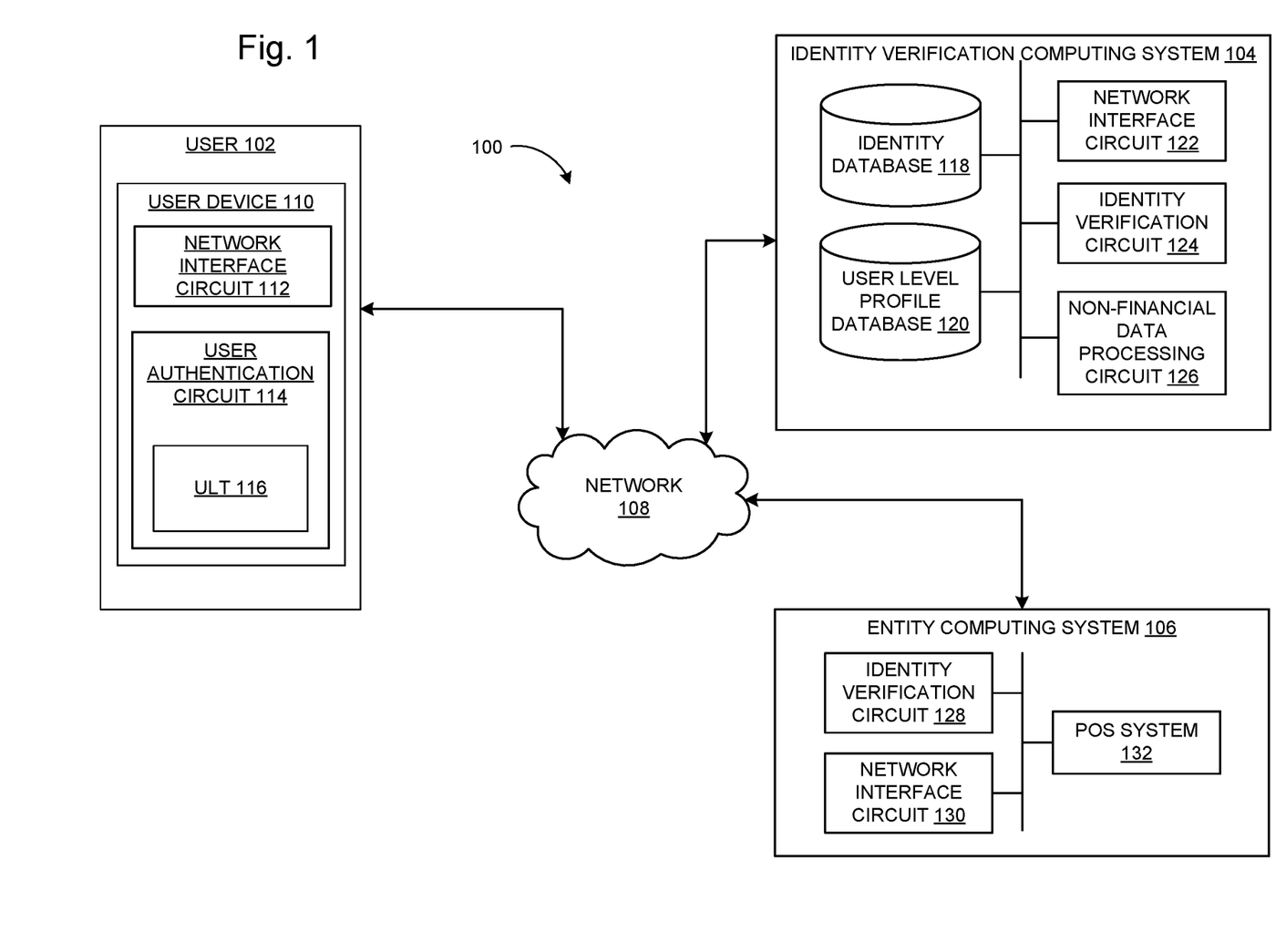
FIG. 1 is a block diagram of a data processing system, according to an embodiment.

FIG. 1 is a block diagram of a user authentication system 100, according to an embodiment. The user authentication system 100 includes a user 102, an identity verification computing system 104, and an entity computing system 106. The user 102, the identity verification computing system 104, and the entity computing system 106 may communicate directly or through a network 108, which may include one or more of the Internet, cellular network, Wi-Fi, Wi-Max, a proprietary banking network, or any other type of wired or wireless network. It should be understood that, according to various embodiments, data transmitted between any of the user 102, the identity verification computing system 104, and the entity computing system 106, either directly or via the network 108, may be encrypted or otherwise cryptographically protected.

The user 102 may be associated with a user device 110. The user device 110 is a device configured to communicate with the entity computing system 106. In some embodiments, the user device 110 communicates directly with the entity computing system 106. For example, the user device 110 may communicate wirelessly to the entity computing system 106, such as via Wi-Fi, Bluetooth, Near Field Communication (NFC), Zigbee, IR, RF, Cellular (3G, 4G, LTE, CDMA), etc. In other embodiments, a display on the user device 110 may generate a machine readable image which may be readable by the entity computing system 106, such as a bar code, a QR code, or other machine readable image. The machine readable image may contain user related data, such as a user-level token (ULT). In other embodiments, the user device 110 communicates with the entity computing system 106 via the network 108. For example, the user device 110 may communicate with the network 108 via a wireless connections, such as Wi-Fi, Wi-Max, cellular (3G, 4G, LTE, CDMA, GSM, etc.), Zigbee, LoRA, Bluetooth, IR, RF, or other applicable wireless protocol. In other examples, the user device 110 may communicate with the network 108 via a wired connection, such as via Ethernet, a LAN, a WAN, Firewire, USB, or other applicable wired interface.

The user device 110 may be, but is not limited to a phone (e.g., iPhone, Android Phone, Windows Phone, or other smartphone), a mobile computing device (e.g. tablet computer, laptop computer, personal digital assistant, netbook, etc.), a desktop computing device, a wearable computing device, or the like. The user 102 may be associated with the user device 110, such that the user device 110 is utilized for authentication purposes. For example, the user device 110 may include an input device for the user to enter a password, a fingerprint scanner to scan a finger print, etc., and authentication of the user by the user device 110 may be leveraged to facilitate authentication of the user to the entity computing system 106. In other arrangements, however, multiple users are associated with the same user device 110. For example, a husband and wife may be associated with the same tablet computer. In some instances, the husband and wife may have separate accounts, or log-ins, on the same user device 110. In still other arrangements, the user 102 uses multiple user devices 110, or the user device 110 may be a public computing device used by a number of persons.

The user device 110 is shown to include a network interface circuit 112 and a user authentication circuit 114. The network interface circuit 112 is configured to facilitate data communication to and from other devices via the network 108. In some embodiments, data passing through the network interface circuit 112 is encrypted. The network interface circuit 112 may include any combination of wired network 108 protocols (e.g., Ethernet, USB, Thunderbolt, Firewire, etc.), and wireless network protocols, such as Wi-Fi, Bluetooth, cellular (3G, 4G, LTE, CDMA, GSM, etc.), Zigbee, LoRA, etc.

The user authentication circuit 114 is structured to allow the user device 110 to communicate data to and from the identity verification computing system 104 via the network interface circuit 112 and the network 108. For example, the user authentication circuit 114 may include a user interface that permits the user 102 to provide information to the identity verification computing system 104 via the user device 110. The user authentication circuit 114 may also be utilized to display messages and other prompts from the identity verification computing system 104. For example, the user 102 may utilize the user authentication circuit 114 to establish a user account with the identity verification computing system 104, or to request authentication services on behalf of the user 102. In one embodiment, the user authentication circuit 114 may store one or more user-level tokens 116.

In some embodiments, the user authentication circuit 114 includes programming instructions stored in a memory of the user device 110 that is executed locally on the user device 110 (e.g., as a smartphone application). For example, the user authentication circuit 114 may be or include, a mobile banking application associated with the identity verification computing system 104. In other arrangements, the user authentication circuit 114 includes a web-based interface application accessed via the network 108 (e.g. the Internet), such as by a web browser executed on the user device 110. In such arrangements, the user authentication circuit 114 may be executed and/or maintained remotely by the identity verification computing system 104. In this instance, the user 102 logs onto or accesses the web-based interface to access the user authentication circuit 114. In some embodiments, the user authentication circuit 114 is supported by a separate computing system comprising one or more servers, processors, network interface circuits, etc. In further arrangements, the user authentication circuit 114 includes or utilizes an application programming interface (API) and/or a software development kit (SDK) that facilitates the integration of other applications (e.g., a mobile banking application, a mobile wallet application, a virtual passport application, a third party provider application, etc.) with the user authentication circuit 114.

The identity verification computing system 104 and the entity computing system 106 may each include a computer system (e.g., one or more servers, each with one or more processing circuits), each including a processor and memory. The processors may be implemented as application specific integrated circuits (ASICs), one or more field programmable gate arrays (FPGAs), a group of processing components, or other suitable electronic processing components. The memory may be one or more devices (e.g., RAM, ROM, Flash memory, hard disk storage, etc.) for storing data and/or computer code for completing and/or facilitating the various processes described herein. The memory may be or include non-transient volatile memory, non-volatile memory, and non-transitory computer storage media. The memory may include data base components, object code components, script components, or any other type of information structure for supporting the various activities and information structures described herein. The memory may be communicably connected to the processor and include computer code or instructions for executing one or more processes described herein. The identity verification computing system 104 and the entity computing system 106 may each include server-based computing systems, for example, comprising one or more networked computer servers that are programmed to perform the operations described herein. The identity verification computing system 104 and the entity computing system 106 may each be implemented as distributed computer systems where each function is spread over multiple computer systems.

In one embodiment, the identity verification computing system 104 is managed by a third-party service provider to provide identity verification services to various entities. For example, the entity computing system 106 may utilize the identity verification computing system 104 to verify that the user 102 is who he or she purports to be. The entity computing system 106 may wish to verify the identity of the user 102 for any of various reasons, such as to prevent payment (e.g., credit card) fraud, banking fraud, identity fraud, illegal activity (e.g., harassment, scams, money laundering, etc.), catfishing, sockpuppetry, underage signups, spamming, etc. The identity verification computing system 104 may be a trusted third-party computing system that is configured to verify that the user 102 is who he or she purports to be. The identity verification computing system 104 may provide identity verification services through an API. Generally, an API is a software-to-software interface that allows computing systems of two different entities to communicate with each other. In this instance, the API of the identity verification computing system 104 may be used by the entity computing system 106 and other entities to verify the identities of individuals. The identity verification computing system 104 may distribute a software development kit (SDK) to allow the customers to better integrate the API into their websites and applications. Some embodiments may include multiple identity verification computing systems 104.

According to various embodiments, the identity verification computing system 104 may be managed by an FI, a governmental institution, a credit bureau, a dedicated identity verification service provider, or another type of business or entity. For example, the identity verification computing system 104 may be managed by an FI that provides banking services (e.g., deposit account services, credit account services, brokerage account services, etc.) to individuals and entities, such as the user 102. In the instance in which the user 102 is a current financial account holder, the identity verification computing system 104 (e.g., FI) already has a significant amount of information regarding the individual's identity, which has been collected through the onboarding process for opening an account with the FI. During the initial onboarding process used by the FI to verify the user 102, and before permitting the user 102 to become an account holder, the user 102 may be required to provide certain personal information, such as a legal name, address, contact information, driver's license number, tax identification number, social security number, and the like. The personal information provided during the onboarding process was previously verified prior to permitting the user 102 to open an account with the FI. Such information may be provided in connection with KYC and/or CIP regulations.

The identity verification computing system 104 includes an identity database 118, a user-level profile database 120, a network interface circuit 122, and an identity verification circuit 124. The identity database 118 stores information relating to the identities of individuals, customers, users, account holders, etc. The identity database 118 may also store information relating to the identity service. Similarly, the user-level profile database 120 stores information relating to generated user-level profiles for each user 102. As described above, the user-level profiles may include additional information about a user 102, such as identity information of the user 102 (age, address, name, height, weight, biometrics, etc.), non-financial account information (frequent flyer program information, rewards/loyalty program information, social media accounts, on-line service accounts such as online dating accounts, etc.), multiple IDs (personal, business, etc.). In certain embodiments, the user-level profile database 120 may be in communication with the identity database 118, and may initially populate a user-level profile for the user 102 with data contained in the identity database 118. In other embodiments, the identity database 118 and the user-level profile database 120 may be part of the same database schema.

The network interface circuit 122 facilitates data communications to and from the identity verification computing system 104. The network interface circuit 122 includes hardware (e.g., Ethernet controller, memory, etc.) and software necessary to facilitate data communications for the identity verification computing system 104 over the network 108. In some embodiments, data passing through the network interface circuit 122 is encrypted. The network interface circuit 122 may include any combination of wired network protocols (e.g., Ethernet, USB, Thunderbolt, Firewire, etc.), and wireless network protocols, such as Wi-Fi, Bluetooth, cellular (3G, 4G, LTE, CDMA, GSM, etc.), Zigbee, LoRA, etc.

The identity verification circuit 124 is structured to generate and manage user-level profiles and user-level tokens 116 for individuals, and to verify the identity of individuals. For example, the identity verification circuit 124 may generate a user-level profile for the user 102, based on various types of personal identifying information, as described above. In some embodiments, the identity verification circuit 124 populates a user-level profile for the user 102 based on user information already stored in the identity database 118 that is related to the user 102. In further embodiments, the user 102 may be able to provide information to the identity verification circuit 124, such as via the user device 110, for populating the user-level profile.

According to various embodiments, the user authentication system 100 may include multiple identity verification computing systems 104 and multiple entity computing systems 106.

The entity computing system 106 may include an identity verification circuit 128, a network interface circuit 130 and a point-of-sale (POS) system 132. The identity verification circuit 128 is structured to verify the identity of individuals via operative communication with the identity verification circuit 124 of the identity verification computing system 104. For example, the identity verification circuit 128 may be structured to analyze information received from the user 102 to format and send API calls to the identity verification computing system 104 to verify the identity of individuals. The network interface circuit 130 facilitates data communications to and from the entity computing system 106. The network interface circuit 130 includes hardware (e.g., Ethernet controller, memory, etc.) and software necessary to facilitate data communications for the entity computing system 106 over the network 108.

According to various embodiments, identity verification may be facilitated through the POS system 132 of the entity computing system 106. In some embodiments, a user-level token is transmitted to the identity verification computing system 104, and the identity of the user 102 is authenticated, in-whole or in-part, via the user-level token. For example, the POS system 132 may include a cash register system operated by the entity computing system 106. In this arrangement, a user-level token may be transmitted from the user device 110 to the POS system 132, and from the POS system 132 to the identity verification computing system 104. In another embodiment, the POS system 132 may include a backend server system that provides a website (e.g., an online shopping website) and/or a mobile application (e.g., a smartphone application, a tablet application, etc.) associated with the entity computing system 106. Other embodiments may not include a POS system 132. For example, in some embodiments, the entity computing system 106 may be operated by an individual, and identity verification may be facilitated via a device (e.g., smartphone) of the individual rather than the POS system 132. In such arrangements, a user-level token may be transmitted from the user device 110 to the identity verification computing system 104 without being routed through the POS system 132, e.g., in embodiments where a payment card network is not utilized to transmit the ULT.

In some embodiments, the POS system 132 includes additional information related to the POS system 132. For example, the POS system 132 may have information related to the type of POS system 132 (e.g. ATM, back-end server, cash register, etc.), location of the POS system 132, etc. Moreover, in other embodiments, the entity computing system 106 itself generates additional information. For example, the entity computing system 106 may generate contextual information such as location of the user 102, the type of transaction being performed by the user 102 (e.g. online purchase, identity verification request, etc.), and/or third party identification information (e.g. subscription services such as an online dating site, age restricted content provider, age restricted vendors, etc.), which may all provide contextual information to the identity verification computing system 104.

Figure 2:
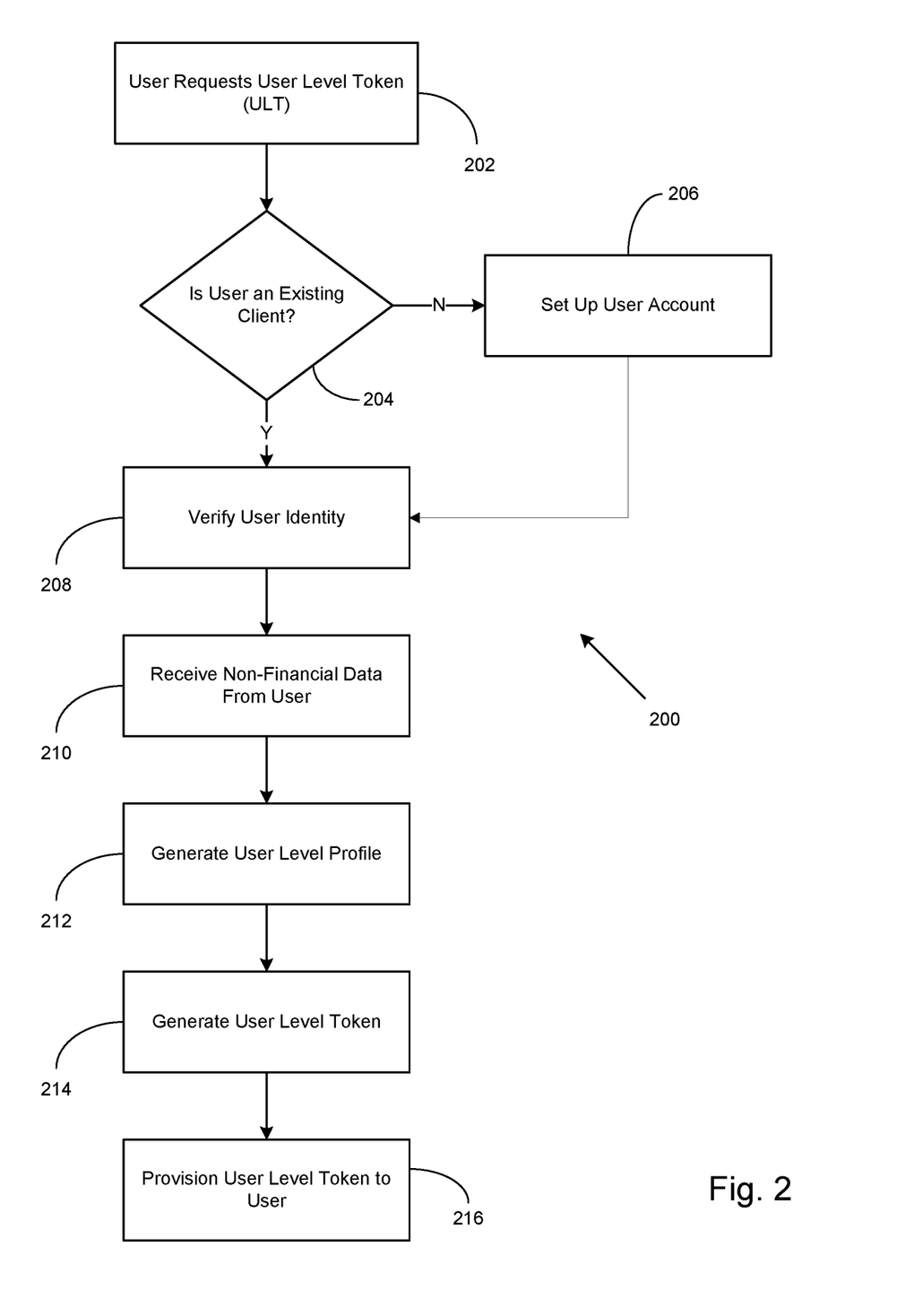
FIG. 2 is a flow diagram illustrating generation and provisioning of a user-level token to a user, according to an embodiment.

Turning to FIG. 2, a flow diagram illustrating the generation and provisioning of a ULT to a user 102 is shown, according to an embodiment. For clarity and brevity, the method 200 is discussed below in connection with the user authentication system 100 of FIG. 1. More specifically, the method 200 may be performed by the identity verification computing system 104 of FIG. 1. However, it should be understood that the method 200 may be performed by other systems and devices.

At process block 202, a user, such as user 102, may request a ULT. In one embodiment, the user 102 requests the ULT via a user device, such as user device 110, described above. For example, the user 102 may request a ULT from the identity verification computing system 104 by accessing a smartphone application associated with the identity verification computing system 104, such as mobile banking application, or mobile wallet application. In other embodiments, the user 102 accesses the identity verification computing system 104 by logging into a web-based application (e.g. website) associated with the identity verification computing system 104. However, other methods of requesting a ULT may also be used.

The process 200 then determines if the user 102 has an existing account with the institution associated with the identity verification computing system 104. For example, where the institution is a financial institution, the process 200 may determine if the user 102 has an existing account with the financial institution, such as a savings account, a checking account or a brokerage account. If the user 102 does not have an existing account or relationship with the institution associated with the identity verification computing system 104, the user 102 may be instructed to set up a user account at process block 206. Where the institution is an FI, the user 102 may be required to provide identifying information to allow the identity verification computing system 104 to initially verify the identity of the user 102. The identifying information may include authentication credentials and information that may be used by the identity verification computing system 104 to authenticate the user 102. Example identifying information may include legal name, address, date of birth, contact information, driver's license number, tax identification number, social security number, and the like. In one embodiment, the personal identifying information provided during the new account opening process is verified prior to the user 102 being permitted to open an account with the institution. Such information may be provided in connection with KYC and/or CIP regulations.

Once the user 102 is determined to have an existing account with the institution at process block 204, or successfully sets up an account with the institution at process block 206, the identity of the user 102 requesting the ULT is verified at process block 208. In one embodiment, the identity of the user 102 is verified using personal identifying information supplied by the user 102 when setting up the account with the institution. Once the identity of the user 102 has been verified, the user 102 may be instructed to provide non-financial data at process block 210. Non-financial data may include non-financial information such as various identity information of the user 102 (height, weight, biometrics, etc.), non-financial account information (frequent flyer program information, rewards/loyalty program information, social media accounts, on-line service accounts such as online dating accounts, etc.), multiple IDs (personal, business, etc.), or other relevant non-financial data. In some embodiments, the user 102 may also provide permissions associated with the provided non-financial data. The permissions may be provided by the user 102 to instruct the identity verification computing system 104 as to what non-financial data may be provided to a third party. In some examples, the user 102 may specify what non-financial data should not be shared with any third party; however, in other examples, the user 102 may specify what non-financial data is accessible to different types of third parties. For example, the user 102 may specify that a financial institution may have access to any of the supplied non-financial data that is requested, but restrict what non-financial data a point-of-sale third party (e.g. consumer stores) may have access to. For example, the user 102 may not allow a point-of-sale third party to have access to user-level information such as credit scores.

Having received the non-financial data from the user 102, the process can generate a user-level profile associated with the user 102 at process block 212. In one embodiment, the user-level profile is stored in the user-level profile database 120. In further embodiments, the non-financial data processing circuit 126 may generate the user-level profile based on the non-financial data provided by the user 102. In some examples, the user 102 may already have an existing user-level profile. Where the user 102 has an existing user-level profile, the user 102 may be able to provide additional non-financial data to the identity verification computing system 104, which may process the data using the non-financial data processing circuit 126, and subsequently update the user-level profile associated with the user 102. The user-level profile may include all the non-financial data provided by the user 102 at process block 210, as well as identifying information previously associated with the user 102 that was provided to set up the initial account. The user-level profile may further include information related to permissions provided by the user 102.

At process block 214, the non-financial data processing circuit 126 may generate a unique ULT associated with the generated user-level profile for the user 102. The ULT may be formatted the same as a tokenized primary account number ("TPAN"), or payment token. In one embodiment, the ULT is associated directly with the institution generating the ULT. In some examples, the ULT may include a prefix, such as a bank identification number ("BIN"), which defines where the ULT should be routed when presented by the user 102. In a further embodiment, the ULT is stored in a token vault, which maps the ULT to a given user-level profile. For example, the token vault may be stored in the user-level profile database 120. In other embodiments, the ULT may be managed by an external token service provider ("TSP"). In some embodiments, the non-financial data processing circuit 126 may further generate sub-ULTs for different identities associated with the user 102. The sub-ULTs can be structured to return different types of information, based on context. In one embodiment, the user 102 may structure the different identities to correspond with different transactions. For example, the user 102 may structure one identity to be used with social media services, such as blogs, dating websites, etc. The identity associated with the social media services may be configured to only provide verification of the identity of the user 102, and, where required, other basic information, such as the age of the user 102. In further examples, the user 102 may structure a separate identity to be used with purchases. The identity associated with making purchases may be configured to provide verification of the identity of the user 102, as well as other information, such as age verification, loyalty program information, and/or credit information. The user 102 may create as many sub-ULTs as needed for different services/entities.

Once the ULT has been generated at process block 214, the ULT may be provisioned to the user 102 at process block 216. In one embodiment, the ULT may be transmitted to the user device 110 by the identity verification computing system 104, via the network 108. In some examples, the identity verification computing system 104 may push the ULT directly to the user device 110. In other examples, the user 102 may need to perform a specific action to get the ULT provisioned to the user device 110. For example, the user 102 may need to log into their account with the institution that generated the ULT in order to download the ULT onto the user device 110. In some embodiments, the ULT is stored in the user authentication circuit 114 of the user device 110. For example, the ULT may be stored in a mobile wallet or other application running on the user device 110.

Figure 3:
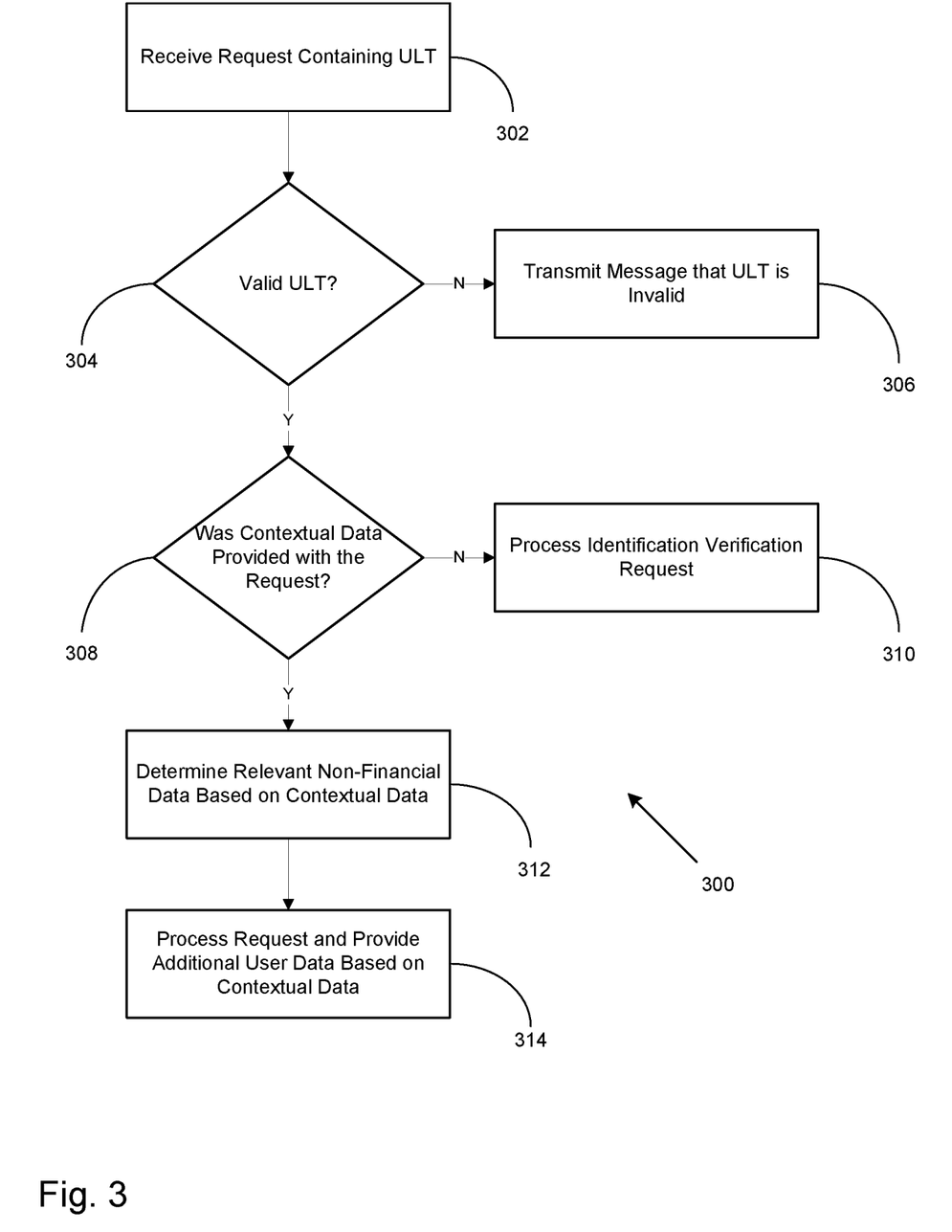
FIG. 3 is a flow diagram of a method of processing an identity verification request, according to an embodiment.

Turning to FIG. 3, a flow diagram illustrating the processing of a ULT provided by a user is shown, according to an embodiment. For clarity and brevity, the method 300 is discussed below in connection with the user authentication system 100 of FIG. 1. More specifically, the method 300 may be performed by the identity verification computing system 104 of FIG. 1. However, it should be understood that the method 300 may be performed by other systems and devices.

At process block 302, an identity verification request containing a ULT is received by the identity verification computing system 104. In one embodiment, the user 102 may present the ULT to the POS system 132. For example, the user 102 may tap the user device 110 against the POS system 132 to transmit the ULT. The ULT may be able to be transmitted via NFC, Bluetooth, or other wireless transmission protocols. In other examples, the user 102 may provide the ULT as a machine readable code (e.g. barcode or QR code) displayed on a user interface of the user device 110, which can then be read by the POS system 132. The POS system 132 may then transmit the ULT to the identity verification computing system 104 via the network 108. In some examples, the machine readable code may be read by another user device, such as a separate smartphone. In some embodiments, the user 102 may transmit the ULT to the entity computing system 106, via the network 108. The entity computing system 106 may then transmit the ULT to the identity verification computing system 104 via the network 108.

The parameters of the user device 110 may be verified to ensure that proper security is active on the user device 110. In one embodiment, the identity verification computing system 104 verifies that there the user device 110 is only accessible by authorized users 102. For example, the identity verification computing system 104 may verify that the user device 110 has a lock mechanism in place, such that an unlock code must be provided to access the user device 110. Example unlock codes may include PIN numbers, passwords, fingerprint scans, retinal scans, facial recognition scans, security tokens, or other applicable unlock codes. If the identity verification computing system 104 determines that insufficient security exists on the user device 110, a message may be sent to the user 102 requiring the user 102 to provide additional authentication information to verify that the user 102 is in possession of the user device 110 when the ULT 118 is used. For example, the user may be required to use the phone to provide the identity verification computing system 104 with live video of the user's face, which may then be compared by the identity verification computing system 104 to a previously stored photograph of the user (e.g., the photograph in the user's driver's license).

In some embodiments, the ULT is received from a device that is known and authenticated by the identity verification computing system 104. For example, the ULT may be received from the POS system 132 (e.g., identified by a unique identifier), which has been verified by the identity verification computing system 104 as being securely managed by a particular merchant. In some embodiments, the ULT and/or other data transmitted to and from the identity verification computing system 104 is encrypted or otherwise cryptographically protected. For example, in one embodiment, the POS system 132 signs the ULT with its public/private key pair and a public key associated with the identity verification computing system 104. The identity verification computing system 104 may then decrypt the ULT with its private key and the public key of the POS system 132.

In some embodiments, the identity verification request can be transmitted using an existing payment channel. For example, the entity computing system 106 may transmit the identity verification request to the identity verification computing system 104 in a standard card-based transaction message. For example, the identity verification request may be part of the general message derived from a card-based transaction (e.g. credit card transaction, debit card transaction, etc.). A typical card-based transaction message may include information derived from the card associated with the transaction (e.g. an account number associated with the card), the point-of-transaction terminal (e.g. entity computing system 106) identifier, such as a merchant ID, transaction information, as well as other data which can be generated or added by intervening systems. For example, the entity computing system 106 may include additional information into the card-based transaction message.

Figure 4A:
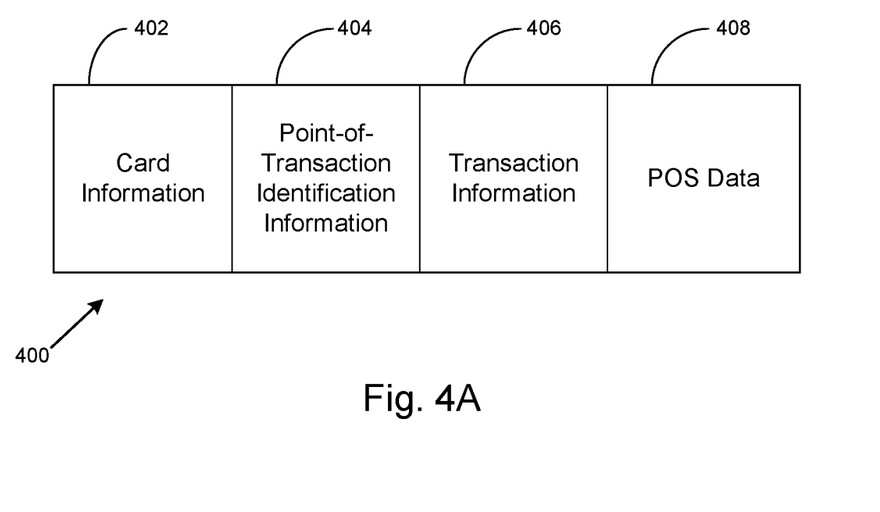
FIG. 4A is a block diagram illustrating a card-based transaction message, according to an embodiment.

Turning now to FIG. 4A, an exemplary card-based transaction message 400 is shown, accordingly to some embodiments. The card-based transaction message 400 can include a card information portion 402, a point-of-transaction identification information portion 404, a transaction information portion 406 and a POS data portion 408. The card information portion 402 can include information about the card (e.g. the payment mechanism), such as an account number. In some embodiments, the card information portion 402 can be configured to include a ULT associated with the user 102, such as the ULT 116 described above. In one embodiment, the ULT is formatted the same as a personal account number (PAN). In other embodiments, the ULT is formatted the same as a tokenized account number (TPAN). By configuring the ULT similar to a PAN and/or TPAN, the ULT can be transmitted via a payment card network using the standard card-based transaction message 400. While the ULT is discussed as formatted as a PAN and/or TPAN above, it is contemplated that the ULT can be formatted similar to other known card-identification messages.

The point-of-transaction identification information portion 404 can include various information associated with the point-of-transaction (e.g. entity computing system 106). For example, the point-of-transaction identification information portion 404 can include a merchant ID number. The point-of-transaction identification information portion 404 may also include merchant information, such as merchant type (e.g. physical location, internet-based entity, etc.), merchant location, or other general merchant information. The transaction information portion 406 may include information about the transaction, such as the amount of the transaction, the time of the transaction, etc. The POS data portion 408 may include various information related to the transaction. For example, the POS data portion 408 may include contextual data related to the transaction, such as the type of purchase being made, the type of merchant (e.g. airline, sporting venue, grocery store, electronics store, on-line retailer, restaurant, etc.), location of the transaction, and/or type of transaction (e.g. physical card, on-line purchase, mobile wallet, etc.). In some embodiments, the POS data portion 408 may include a ULT associated with the customer. For example, a ULT associated with the customer may be inserted into the POS data portion 408 of the message instead of, or in combination with, the card information portion 402, as described above. By inserting the ULT into a standard card-transaction message, the ULT can be provided to a system, such as identity verification computing system 104, using a typical card-based payment communication scheme.

Figure 4B:
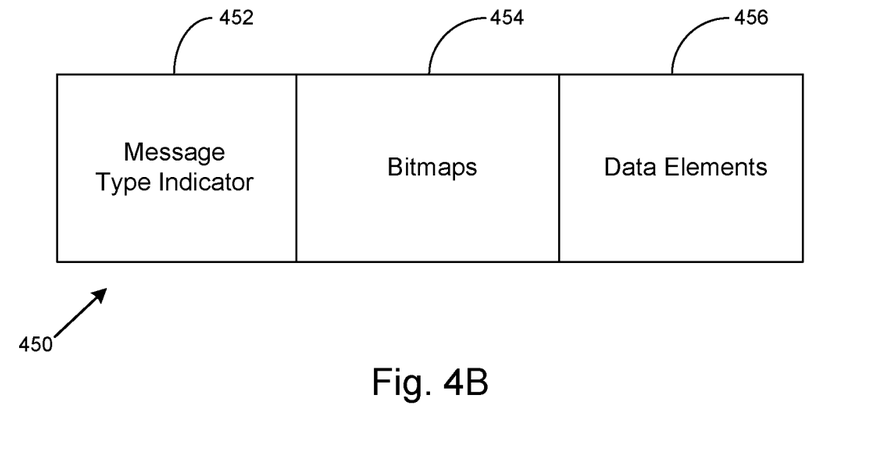
FIG. 4B is a block diagram illustrating an ISO 8583-compliant card-based transaction message, according to an embodiment.

In some embodiments, the card-based transaction message may be formatted as an ISO 8583-compliant message. ISO 8583 defines message formats and communication flows to allow for different types of systems to perform card-based transactions. Turning now to FIG. 4B, an exemplary ISO 8583-compliant card-based transaction message 450 is shown, according to some embodiments. The ISO 8583-compliant message 450 may include a message type indicator 452, one or more bitmaps 454, and a number of data elements 456. In one embodiment, the message type indicator 452 is a four digit numerical field, which may be used to classify the high level function of the message. For example, the message type indicator 452 can be used to indicate the ISO 8583 version of the ISO message 450. The message type indicator 452 can further be used to indicate a class of the message. For example, whether the message is an authorization message, a financial message, a reconciliation message, an administrative message, or any other message class utilizing ISO 8583 messages. The message type indicator 452 can further be used to indicate a function of the message to define how the message should flow within a system. Message functions can include requests (end-to-end messages), or advices (point-to-point messages). Additionally, message functions may include notifications, and/or instructions. Finally, the message type indicator 452 can be used to indicate a message origin. The message origin may be with an acquirer, an issuer, or other entity.

The bitmaps 454 may be configured as a field or sub-field within the message which can indicate which data elements 456 or data element subfields may be present in a message. In some embodiments, the bitmaps 454 may include a primary bitmap, which can indicate which of data elements 456 one to sixty-four are present. Additional bitmaps 454 (secondary, tertiary, etc.) can further be used to indicate which data elements 456 beyond sixty-four are present in the message. In one embodiment, a specific data element 456 is only present when a specific bit in the bitmap is "true." The bitmap may be expressed as a binary value, such as an eight byte message, a hexadecimal value, an ASCII character set, or an EBCDIC character set. The data elements 456 may include a number of individual fields containing information about the transaction. For example, in some ISO 8583-compliant messages, there may be up to one-hundred ninety-two data elements 456; however more or fewer data elements 456 are also contemplated. The data elements 456 may include specific data elements, general purpose data elements, system-specific data elements, and/or country-specific data elements. Further, each individual data element 456 may be described using a standard format which can define the permitted content of the field (e.g. numeric value, binary value, hexadecimal value, alphanumeric value, etc.) and a field length (e.g. variable length or fixed length).

The data elements 456 may include contextual data which may be processed by a FI or other system, such as identity verification computing system 104. For example, data elements 456 may provide a time of transaction, a date of a transaction; a merchant type, a payee; an account identification, a custom field, or any other data element field available in the data element 456. Further, in some embodiments, a ULT, such as ULT 116, may be transmitted as a data element within the data elements 456. In one embodiment, the ULT could be provided as a primary account number (PAN) (data field 2) data element, an extended PAN (data element 34), or as a custom or private data elements (e.g. via data element 48, 61, etc.). Similar to above, by using an ISO 8583-compliant message to transmit the ULT, a common messaging format over an existing card-based transaction network can be utilized to provide a ULT, along with contextual data, to an identity verification computing system, such as identity verification computing system 104. While the above examples illustrate transmitting a ULT and contextual data over known card-based transaction messages, it is contemplated that other card-based transaction messages may be used to transmit the ULT and/or contextual data from the entity computing system 106 to the identity verification computing system 104.

Returning now to FIG. 3, at process block 304, the ULT may be analyzed to determine if the ULT is valid. In one embodiment, the identity verification circuit 124 analyzes the ULT to determine if it is valid. For example, the identity verification circuit 124 may evaluate the ULT to determine if it has expired. To determine if the ULT has expired, the identity verification circuit 124 may access the token vault used to store the ULT. In other embodiments, the identity verification circuit 124 may communicate with a TSP responsible for managing the ULT to determine if the ULT is still valid. In still further embodiments, the identity verification circuit 124 may evaluate other data provided with the ULT, such as biometric data (e.g. fingerprint or eye scans), to determine if the ULT is valid. While the above examples describe the identity verification circuit 124 determining the validity of the ULT, it is contemplated that other components within the identity verification computing system 104 may be used to verify the validity of the ULT.

If the ULT is determined to be invalid at process block 304, the identity verification computing system 104 may transmit a message to the user 102 and/or the entity computing system 106 that the ULT is invalid at process block 306. If the ULT is determined to be a valid ULT at process block 304, the identity verification computing system 104 can determine if any contextual data was received along with the identity verification request and the ULT. Contextual data may include geo-location of where the ULT was presented to the entity computing system 106, information relating to the type of entity computing system 106 that first received the ULT (e.g. ATM, POS station, on-line store, etc.). In further embodiments, the identity verification computing system 104 may analyze other information, such as the previous transaction history of the user 102 to further determine if there is any applicable contextual data associated with the request. In one embodiment, the non-financial data processing circuit 126 determines if there is any contextual data associated with the request. However, other components within the identity verification computing system 104 may also determine if there was contextual information associated with the request. In some embodiments, the identity verification circuit 124 is structured to infer contextual information based on the received ULT. For example, in some embodiments, the identity verification circuit 124 defines contextual information based on the device from which the ULT was received. For example, in some embodiments, the identity verification circuit 124 analyzes an address or other unique identifier (e.g., MAC address, IP address, etc.) of the device from which the ULT was received. In some embodiments, the ULT is digitally signed, and the identity verification circuit 124 is structured to verify the digital signature prior to evaluating the ULT. The evaluation of contextual data will be examined more in the examples that follow.

If the identity verification computing system 104 determines that no contextual data was provided with the request, the identity verification computing system 104 simply processes the received request (e.g. identity verification) without providing any additional information to the entity computing system 106, at process block 310. For example, the identity verification computing system 104 may provide an identity verification approval to the entity computing system 106 if the ULT received at 302 matches a valid user-level profile. If the identity verification computing system 104 does determine that contextual data is associated with the request, the identity verification computing system 104 may then determine if there is any relevant non-financial data that can be provided to the entity computing system 106 based on the contextual data, at process block 312. In one embodiment, the identity verification computing system 104 may access non-financial data associated with the user-level profile for the user 102 to determine if there is any relevant data. For example, if the entity computing system 106 is associated with an airline, the request may contain contextual information such as the identification of the entity computing system 106 being a ticketing kiosk within an airport. The identity verification computing system 104 may subsequently process the request, and provide the processed request to the entity computing system 106, along with additional non-financial data based on the provided contextual data, at process block 314. For example, where the entity computing system 106 is determined to be an airline ticketing kiosk, the identity verification computing system 104 may provide the processed request to the entity computing system 106, along with a frequent flier account number of the user 102 associated with the airline. The frequent flier account number may be provided based on a preconfigured profile set up by the requester with the identity verification computing system 104 specifying what additional information should be returned in response to an identity verification request. In other embodiments, the frequent flier account number may be provided responsive to a request within the identity verification request requesting that the frequent flier account number be returned.

In some embodiments, the identity verification computing system 104 is preconfigured to provide certain user data to the entity computing system 106 based on the type of entity computing system 106 that is transmitting the ULT. For example, the identity verification computing system 104 may be pre-configured to respond with a frequent flier account number where the entity computing system 106 is related to an airline. Each merchant that utilizes the identity verification system 104 may be provided with the ability to configure a merchant profile that specifies what information the merchant wishes to receive in connection with responses to identity verification requests. In other embodiments, the submitted request may specify the information that the merchant wishes to receive. In other embodiments, the identity verification computing system 104 may make logical decisions as to what non-financial data to provide based on the received contextual data.

Figure 5:
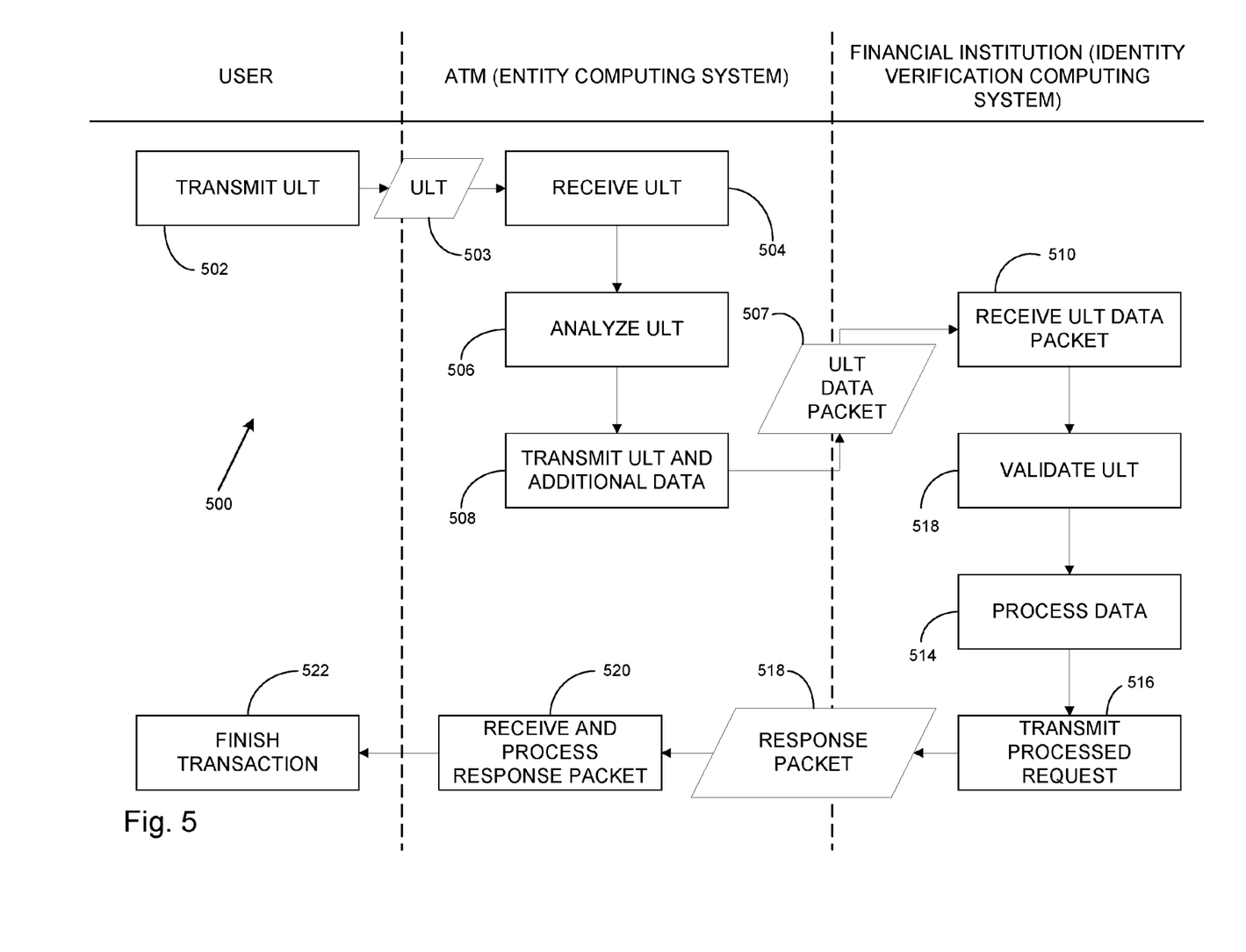
FIG. 5 is a flow diagram illustrating an example implementation of the method shown in FIG. 3.

Turning now to FIG. 5 an example implementation 500 of the above process 300 is shown. In this example, the ULT is used to provide heightened authentication at a third-party ATM, e.g., to allow the user to withdraw an amount of funds in excess of normal withdrawal limits. (The ATM is referred to as "third party" in the sense that the FI that provides the ATM is different than an FI that provides the identity verification computing system 104.) At process block 502 the user 102 may transmit a ULT 503 to the ATM (e.g., which may be part of the entity computing system 106, which is assumed for purposes of the present example to be operated by another FI). For example, the user 102 may wirelessly transmit the ULT 503 to the ATM using a user device, such as the user device 110 described above. The ATM may receive the ULT 503 at process block 504, and subsequently analyze the ULT 503 at process block 506. In one embodiment, the ATM analyzes the ULT 503 to determine where the ULT 503 should be sent to verify the identity of the user 102. For example, the ATM may analyze an identification portion of the ULT 503, such as an embedded BIN number of the ULT 503, to determine where the ULT 503 should be sent for processing. The ATM may then transmit the ULT 503 to the appropriate FI (e.g. identity verification computing system 104), e.g., via backend servers associated with the third party, based on the analysis performed at process block 506. In one embodiment, the ATM transmits the ULT 503 to the identity verification computing system 104 with additional data, such as an ATM identifier, a FI responsible for the ATM, a location of the ATM, etc. The ATM transmits the ULT 503 and the additional data to the identity verification computing system 104 as a ULT data packet 507 at process block 508. The identity verification computing system 104 receives the ULT data packet 507 at process block 510.

At process block 512, the FI analyzes the ULT data packet 507 to verify that the ULT 503 is a valid ULT 503. The FI may then evaluate the additional data in the ULT data packet 507 at process block 514. The identity verification computing system 104 may then access the identity verification request and the user's account to determine if a specific response should be provided to the ATM. For example, the identity verification computing system 104 user 102 may determine that the user wishes to withdraw an amount of funds in excess of normal withdrawal limits. The identity verification computing system 104 may then send a photo of the user obtained from the user's driver's license to the entity computer system 106. The photograph of the user may have been obtained during opening of an account for the user at the FI, e.g., for purposes of compliance with CIP/KYC requirements. Once the identity verification computing system 104 has finished processing the ULT data packet 509, the identity verification computing system 104 transmits a processed request 518 to the entity computer system 106. For example, the processed request 518 may include a verification of the ULT, as well as a picture of the user 102 (e.g., obtained from the user's driver's license). The entity computer system 106 may then receive and process the processed request 518, at process block 520. For example, the entity computer system 106 may compare the photo of the user from the user's driver's license with image data of the user obtained by the ATM. In one example, the ATM may provide the results of the processed request 518 to the user 102, via a user interface on the ATM. For example, if the user 102 wished to withdraw an amount of cash over normal ATM withdrawal transaction limits, the cash may be dispensed to the user by the ATM. The transaction may then be completed at process block 522. In other embodiments, rather than being operated by another FI, the entity computer system 106 may be operated by a merchant, and the comparison of the photo from the user's driver's license may be compared by the entity computer system 106 with live image information of the user obtained by mechanisms other than an ATM for identity verification purposes.

Figure 6:
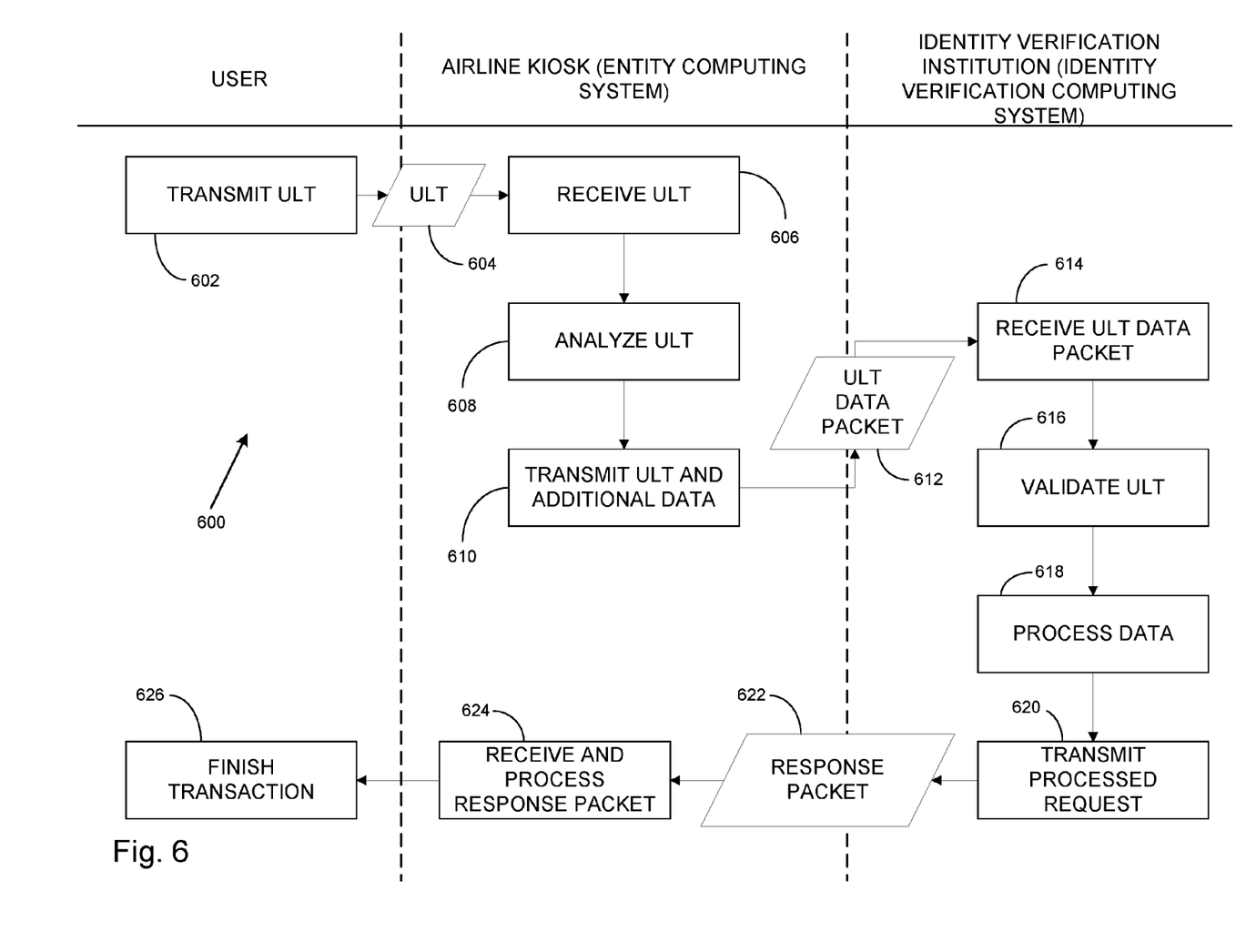
FIG. 6 is a flow diagram illustrating an example implementation of the method shown in FIG. 3.

Turning now to FIG. 6, a further example 600 of the process 300 described above is shown, according to various embodiments. At process block 602, the user 102 may transmit a ULT 604 to a non-FI controller (e.g. an entity computing system 106), such as an airline kiosk. For example, the user 102 may wirelessly transmit the ULT 604 to the airline kiosk using a user device 110, as described above. The airline kiosk may receive the ULT 604 at process block 606. The airline kiosk may then process the ULT 604 at process block 608. For example, the airline kiosk may analyze the ULT 604 to determine what financial institution (or other identity verifying service) the ULT 604 is associated with. Once the airline kiosk has processed the ULT 604, the kiosk can transmit the ULT 604 to the appropriate institution (e.g. the identity verification computing system 104) at process block 610. Similar to above, the airline kiosk may add additional information to the ULT 604 prior to transmitting the ULT 604 to the institution. For example, the airline kiosk may simply put a return address (e.g. the airline kiosk, the entity computing system in general, etc.). Other examples of additional data may include specific requests, or transaction information (e.g. ticket purchase, airline check-in, boarding pass details, etc.). The ULT 604 and additional data are combined in a ULT data packet 612.

The ULT data packet 612 is received by the identity verification computing system 104 at process block 614. The institution may then verify the ULT 604 at process block 616. At process block 618, the institution may process the additional data stored in the ULT data packet 612. For example, the institution may determine that the ULT 604 was presented to an airline kiosk. The institution may then access the user-level profile of the user 102 associated with the ULT to determine if there is any relevant data within the user-level profile based on the additional data. For example, the institution may determine that the user 102 has a frequent flier account associated with the airline transmitting the ULT 604. At process block 620, the institution may generate a response packet 622 as part of transmitting the processed request. In one embodiment, the response packet 622 includes an authentication result indicator (e.g., a binary YES/NO), indicating whether the ULT provided to by the user 102 is a valid ULT. In one embodiment, the response packet 622 may include identity information for the user 102. For example, the response packet 622 may include a name and address of the user 102 that provided the ULT. In one embodiment, the response packet 622 may include a tokenized verification of the ULT 604, as well as additional non-financial data, such as the above-mentioned frequent flier account number. However, other non-financial data may be transmitted as well. For example, where the institution is a financial institution, the response packet 622 may include a tokenized primary account number (TPAN) of one of the payment cards of the user 102 to allow for inflight purchases. In some examples, this may be a time-limited TPAN, such that the TPAN is only good for the duration of the flight of the user 102.

In further examples, the airline kiosk (or other third party entity computing system) may require character limited return messages. Accordingly, the institution may be able to include an indication, such as a token, indicator, or pointer, to access an API of the institution to retrieve the additional information. Alternatively, the indication may instruct the airline kiosk (or other third party entity computing system) to access other conduits to retrieve the information. The response packet 622 may then be transmitted to the airline kiosk at process block 620, and received by the airline kiosk at process block 624. The airline kiosk may then complete the transaction at process block 626.

Figure 7:
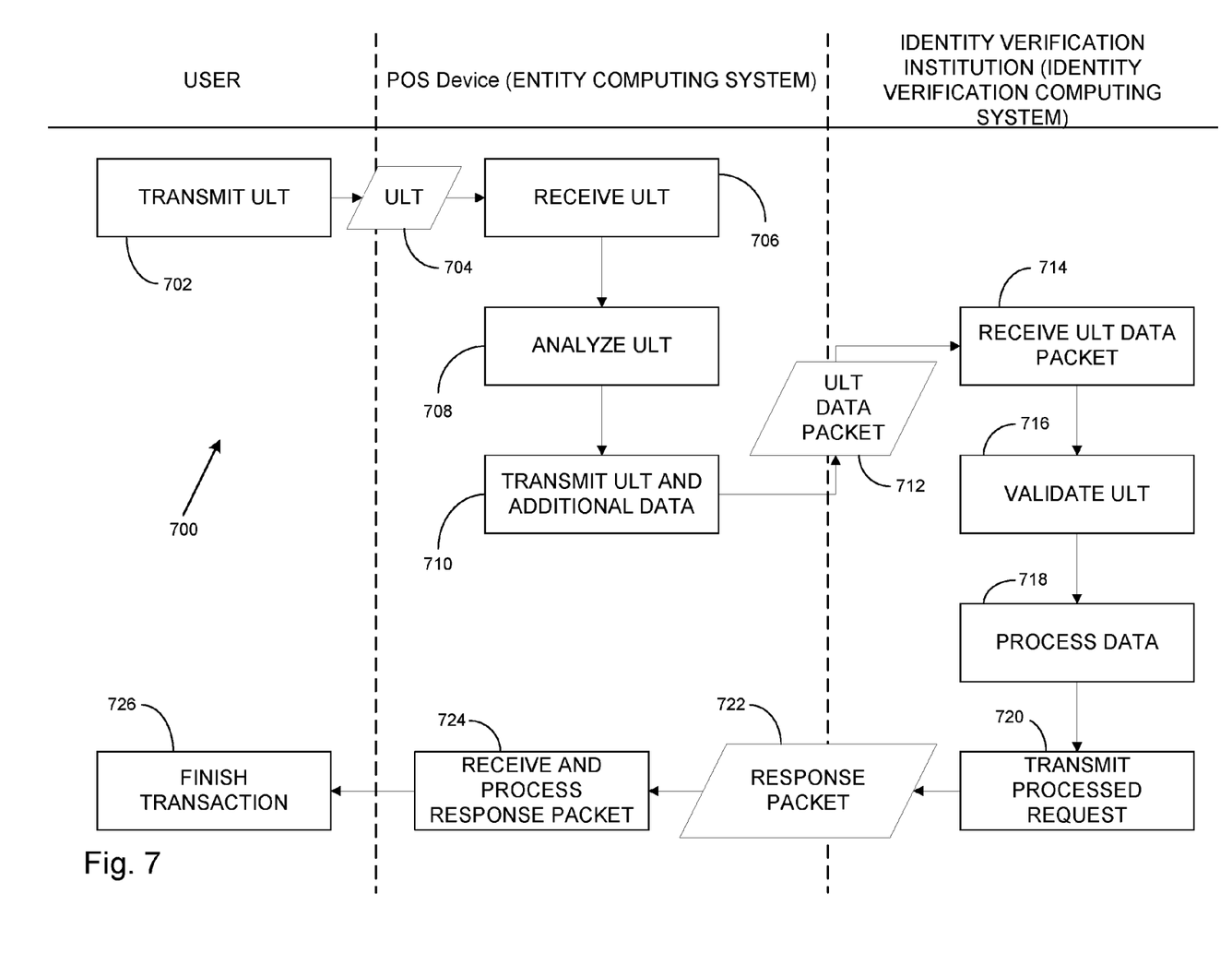
FIG. 7 is a flow diagram illustrating an example implementation of the method shown in FIG. 3.

Turning now to FIG. 7, a further example 700 of the process 300 described above, is shown according to some embodiments. At process block 702, the user 102 may transmit a ULT 704 to a non-financial institution controller (e.g. an entity computing system 106), such as a point-of-sale (POS) device. The POS device may be a POS device as used in a brick-and-mortar store. In other embodiments, the POS device is an online POS device used for making purchases via the internet. For example, the user 102 may wirelessly transmit the ULT 704 to the POS device using a user device, such as user device 110 described above. The POS device may receive the ULT 704 at process block 706. The POS device may then analyze the ULT 704 at process block 708. For example, the POS device may analyze the ULT 704 to determine what FI (or other identity verifying service) the ULT 704 is associated with. Once the POS device has processed the ULT 704, the POS device can transmit the ULT 704 to the appropriate institution (e.g. an identity verification computing system 104). Similar to above, the POS device may add additional information to the ULT 704 prior to transmitting the ULT 704 to the institution at process block 710. In one embodiment, the ULT 704 and additional data are combined in a ULT data packet 712. For example, the POS device may simply put a return address (e.g. the POS device, the store associated with the POS device, etc.). Other examples of additional data may include specific requests, or transaction information (e.g. purchases, credit application etc.) An example of a specific request may be an age verification request. For example, if the user 102 is attempting to purchase an age restricted product, such as alcohol or prescription medication, the POS device may include an age verification request in the ULT data packet 712.

The ULT data packet 712 is received by the identity verification computing system 104 at process block 714. The identity verification computing system 104 may then verify the ULT 704 at process block 716. At process block 718, the identity verification computing system 104 may process the additional data stored in the ULT data packet 712. For example, the identity verification computing system 104 may determine that the ULT 704 was presented along with an age verification request. The identity verification computing system 104 may then access the user-level profile of the user 102 associated with the ULT 704 to determine the age of the user 102. In other examples, the identity verification computing system 104 may determine that the ULT 704 was presented along with a credit verification/report request. The identity verification computing system 104 may then access the user-level profile of the user 102 associated with the ULT 704, to determine if credit information is available in the user-level profile. In some embodiments, the identity verification computing system 104 may perform a credit analysis of the user 102 based on information stored in the user-level profile. The identity verification computing system 104 may generate the credit analysis itself, or send the request, along with the required information, to other institutions in order to obtain the credit verification/report. At process block 720, the identity verification computing system 104 may generate a response packet 722 as part of processing the request. In one embodiment, the response packet 722 may include a tokenized verification of the ULT 704, as well as additional non-financial data, such as the above-mentioned age verification and/or credit verification/report. The user thus does not need to provide date of birth information or a social security number to the merchant in order for the merchant to verify an age or credit worthiness of the user. Hence, security of such information is enhanced.

In some embodiments, financial data may be transmitted as well within the response packet 722. For example, where the institution is a financial institution, the response packet 622 may include a tokenized primary account number (TPAN) of one of the user's 102 payment cards to allow for a purchase to be completed. In some examples, this may be a transaction limited TPAN, such that it is only good for requested transaction. Additionally, in one embodiment, the response packet 722 may include a restricted-use payment token. The restricted-use payment token may allow the user 102 to perform certain financial transactions with the entity computing system 106. The restricted-use payment token may be restricted to use at a certain POS device, during a defined duration; for defined transactions, while the user 102 is located within a defined area, or any combination of the following restrictions. The response packet 722 may then be transmitted to the POS device at process block 720, and received by the POS device at process block 724. The POS device may then complete the transaction at process block 726.

As previously noted, in some embodiments, the user may be provided with a dashboard that enables the user to specify controls over information that may be shared with merchants. For example, the user may specify that some merchants be permitted access to certain information, while other merchants are not to be permitted access to the same information. In some embodiments, the user 102 may configure their account to require the identity verification computing system 104 to request permission from the user 102 before any information about the user is provided to any merchant. In other embodiments, the user 102 may configure their account to specify what information may be shared without permission of the user and what information may be shared but only with the permission of the user. In some embodiments, the user may specify on a merchant-by-merchant basis what information may be shared without approval, which information may be shared but only with approval, and which information may never be shared. In some embodiments, when a user is prompted to provide approval to share information, and the user gives approval, the user is further prompted whether the user wishes to save that setting for that merchant.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions. Software implementations could be accomplished with standard programming techniques with rule based logic and other logic to accomplish the various connection steps, processing steps, comparison steps and decision steps.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A system, comprising:
    an identity verification computing system that comprises a first processor and a first memory that stores executable instructions that, when executed by the first processor, causes the first processor to perform the steps of:
        storing, for each of a plurality of users, non-financial account information in a user-level profile database and user information comprising a photo of each user, wherein the non-financial account information comprises a frequent flier account number;
        receiving a token request for a token from a user of a user device, generating a first token and a second token based on the token request, storing the generated second token in the user-level profile database, and transmitting the first token to the user device;
        receiving a verification request from an entity computing system comprising the first token;
        verifying the received first token by comparing the received first token to the stored second token;
        if the verification request does not comprise context information, transmitting, to the entity computing system, a verification approval based on the comparison of the received first token and the stored second token;
        if the verification request comprises context information including a merchant type;
        if the merchant type is associated with an airport kiosk, transmitting a response comprising the frequent flier account number to the airport kiosk;
        if the merchant type is associated with a transaction at an automated teller machine (ATM), transmitting a response comprising the stored photo of the user to the entity computing system; and
    the entity computing system connected to the identity verification computing system over a network, wherein the entity computing system comprises a second processor, a second memory, and the ATM, wherein the ATM is connected to the second processor, and the second memory stores executable instructions that, when executed by the second processor, causes the second processor to perform the steps of:
        receiving a transaction request for the ATM from the user device comprising the first token and generating the context information for the transaction request, wherein the context information comprises the merchant type;
        transmitting the verification request comprising the received first token and the context information for the transaction request to the identity verification computing system;
        receiving a response from the identity verification computing system comprising the photo of the user and the verification approval of the first token;
        receiving a secondary photo of the user from the ATM;
        verifying the user by comparing the photo received with the verification approval of the first token to the received secondary photo from the ATM; and
        dispensing physical currency to the user via the ATM based on the comparison of the received photo with the verification approval of the first token to the received secondary photo from the ATM.

2. The system of claim 1, wherein the verification request is an ISO 8583-compliant financial transaction card-originated message.

3. The system of claim 1, wherein the merchant type further includes a geo-location of the entity computing system.

4. The system of claim 1, wherein the first token includes a prefix of where the first token is routed.

5. The system of claim 4, wherein the prefix is a bank identification number.

6. The system of claim 1, wherein the instructions, when executed by the first processor, cause the first processor to perform the step of determining that the user holds a financial account at a financial institution associated with the identity verification computing system.

7. The system of claim 1, wherein the instructions, when executed by the first processor, cause the first processor to perform the step of generating one or more sub-user-level tokens, the sub-user-level tokens associated with one or more custom profiles created for the user.

* * * * *